(No Model.) 2 Sheets—Sheet 1.

E. A. BEYL.
CONVERTIBLE CARRIAGE OR SLED.

No. 579,288. Patented Mar. 23, 1897.

Witnesses.
Harry Kilgore,
P. D. Merchant.

Inventor.
Emil A. Beyl.
By his Attorney.
Jas. F. Williamson.

(No Model.) 2 Sheets—Sheet 2.

E. A. BEYL.
CONVERTIBLE CARRIAGE OR SLED.

No. 579,288. Patented Mar. 23, 1897.

Witnesses.
Harry Kilgore.
F. D. Merchant.

Inventor.
Emil A. Beyl.
By his Attorney.
Jas. F. Williamson

UNITED STATES PATENT OFFICE.

EMIL A. BEYL, OF MINNEAPOLIS, MINNESOTA.

CONVERTIBLE CARRIAGE OR SLED.

SPECIFICATION forming part of Letters Patent No. 579,288, dated March 23, 1897.

Application filed April 24, 1896. Serial No. 588,939. (No model.)

*To all whom it may concern:*

Be it known that I, EMIL A. BEYL, a citizen of the United States, residing at Minneapolis, in the county of Hennepin and State of Minnesota, have invented certain new and useful Improvements in Convertible Carriages and Sleds; and I do hereby declare the following to be a full, clear, and exact description of the invention, such as will enable others skilled in the art to which it appertains to make and use the same.

My invention has for its especial object to provide an improvement in the running gear or gears of baby sleds, carriages, and similar vehicles, whereby the same may be readily converted from a sled to a wheeled vehicle for adapting the same both to bare and snow-covered ground.

To these ends my invention comprises the novel devices and combinations of devices hereinafter described, and defined in the claim.

The preferred form of my invention is illustrated in the accompanying drawings, wherein, like letters referring to like parts throughout the several views—

Figure 1:
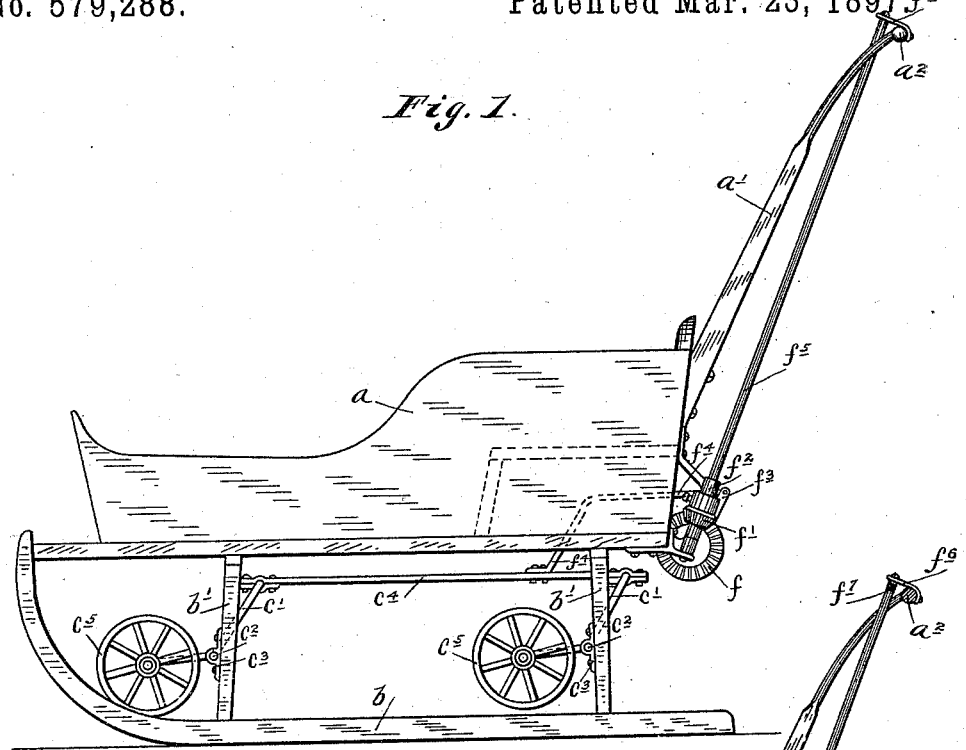
Figure 2:
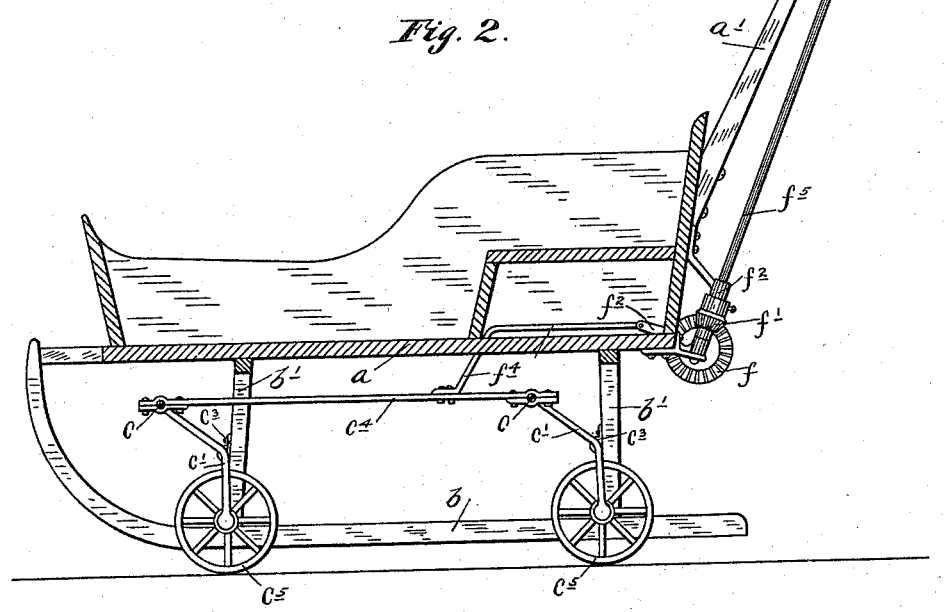
Figure 3:
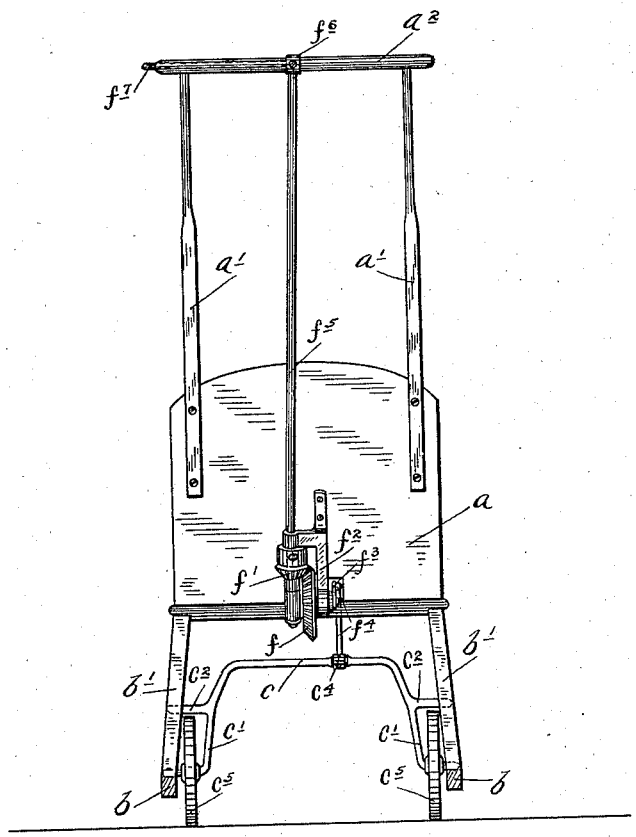

Figure 1 is a side elevation showing a vehicle, such as a baby-carriage, equipped with the preferred form of my invention, the same being shown as adapted for use as a sled. Fig. 2 is a vertical longitudinal section taken through the carriage shown in Fig. 1, the same being shown as adapted for use as a wheeled vehicle; and Fig. 3 is a rear view of the carriage above referred to, the parts being adjusted as shown in Fig. 2.

$a$ indicates the body of the vehicle, which, as shown, is provided with a pair of rigidly-secured rearwardly-projecting push-bars $a'$, tied together at their upper ends by a handle-bar $a^2$. The body $a$ is mounted on a pair of runners $b$, which are rigidly secured to the same by means of vertical runner-legs $b'$.

The carriage-body $a$ is also provided with a wheeled running-gear, the wheels of which are adapted to be moved into and out of contact with the ground at will. As shown, this wheel running-gear comprises the double pair of U-shaped bell-cranks $c\ c'\ c^2$. The fulcrum or pivot pin portions $c^3$ of the bell-cranks are mounted in keepers $c^3$, fixed to the runner-legs $b'$, and the upper ends or tie-bar portions $c$ are connected by a connecting-rod $c^4$. The lower free ends or crank-arm portions $c'$ of the bell-crank levers are each provided with loosely-journaled wheels $c^5$.

As is evident, by moving the connecting-bar $c^4$ toward the rear of the carriage the bell-crank levers $c\ c'\ c^2$ will be moved so as to carry the wheels $c^5$ forward and upward out of contact with the ground, thus allowing the runners $b$ to come in contact with the ground and serve as a support for the carriage-body, as shown in Fig. 1. Again, by forcing said connecting-bar $c^4$ toward the front of the carriage the wheels $c^5$ will be thrown downward below the bottoms of the runners $b$ and into contact with the ground, so that said wheels will become the base of support for the carriage-body, as shown in Figs. 2 and 3.

As shown, the above movement of the connecting-bar $c^4$ is effected by means of the following connections: $f$ indicates a bevel-wheel, and $f'$ a bevel-pinion, both of which are mounted in a bracket $f^2$, secured to the rear end of the carriage-body $a$. $f^3$ indicates a crank-arm which is secured on a common shaft with the bevel-wheel $f$ and the free end of which is connected by means of a link $f^4$ to the longitudinally-movable tie-bar $c^4$. The bevel-wheel $f'$ is secured to the lower end of the rod $f^5$, the upper end of which is journaled in the keeper $f^6$, fixed with the handle-bar $a^2$. The upper end of the rod $f^5$ is provided with a laterally-projecting hand-lever $f^7$, which is adapted to be turned a half-revolution, together with the rod $f^5$ and bevel-pinion $f'$. This half-revolution of the pinion $f'$ will turn the wheel $f$ and crank $f^3$ through a sufficient part, so as to carry the wheels $c^5$ through the intermediate connections either to or from their working positions, as already indicated.

Inasmuch as the hand-lever $f^7$ on the rod $f^5$ is given a half-revolution, it will in either one of its extreme positions lie close to the handle-bar $a^2$, and hence will be entirely out of the way when not in use and within the reach of the person pushing the carriage, when desired.

It will be noted by reference to Figs. 2 and 3 that when the wheels are moved into their operative positions the projecting ends $c^5$ of the levers $c'$ strike against the runner-legs $b'$, and thus lock and limit the rearward movement of said wheels.

The utility of this device is thought to be obvious. The device being adapted to run by the above interchangeable running-gears equally well over bare or snow-covered ground is especially well adapted in the spring of the year or at other times when the ground is but partially covered with snow, or for use in cities, where many of the sidewalks are in the winter time swept clean of snow.

It will also be seen that the runners and wheels may be interchanged by a single movement of the lever $f^7$.

It will also be understood that, while I have described my invention as especially directed to baby-carriages, it is applicable to all classes of vehicles.

It will also be understood that various alterations in the details of construction may be made without departing from the spirit of my invention. For instance, instead of the construction shown, the wheels might be mounted in fixed bearings and the runners given a vertical movement.

My invention may, when constructed for that purpose, be applied to heavy vehicles, such as fire-engines and other fire apparatus, and when cheaply constructed may be applied to children's hand wagons and sleds.

When applied to any of the above vehicles, (and this feature is of special value in connection with baby-carriages,) the same may be left standing on an inclined sidewalk or bare floor or in many other places, without danger of the vehicle running away, by simply letting down the runners.

The term "ground" as used in this specification is, as must be evident, used to generically indicate bare ground, a floor, or other plane on which the vehicle may travel.

What I claim, and desire to secure by Letters Patent of the United States, is as follows:

The combination with the carriage-body $a$ provided with the rearwardly-projecting handle-bar and the runners $b$ $b'$, rigidly secured thereto, of the wheels mounted for vertical movement with respect to said body and runners, by means of the double bell-crank shafts $c$ $c'$ $c^2$, connected by the connecting-link $c^4$, and the operating connections involving the bevel-wheel $f$ having crank-arm $f^3$ connected to said bar $c^4$ by means of the link $f^4$, and the bevel-pinion $f'$ engaging said wheel $f$ and movable by the shifting rod $f^5$ having at its upper end the lateral hand-lever $f^7$, substantially as described.

In testimony whereof I affix my signature in presence of two witnesses.

EMIL A. BEYL.

Witnesses:
  JAS. F. WILLIAMSON,
  F. D. MERCHANT.